Aug. 11, 1931.   T. G. NYBORG   1,817,927
SHAKER CONVEYER
Filed Sept. 23. 1929

Inventor
TAGE GEORG NYBORG,

Patented Aug. 11, 1931

1,817,927

UNITED STATES PATENT OFFICE

TAGE GEORG NYBORG, OF WORCESTER, ENGLAND, ASSIGNOR OF ONE-HALF TO MARK FREDERICK HIGGINS, OF WORCESTER, ENGLAND

SHAKER CONVEYER

Application filed September 23, 1929, Serial No. 394,432, and in Great Britain November 14, 1928.

This invention relates to shaker conveyers.

In shaker conveyers it is found advantageous to use extensible or telescopic troughing at the extreme end, consisting of two overlapping troughs clamped together so that the conveyer can be extended or shortened by un-clamping the two troughs, effecting the desired alteration and clamping the two troughs together again.

The object of the present invention is to provide improved means for effecting the necessary adjustment in the length of the telescopic trough at the end of the conveyer, as, especially when making advance heading, or unloading dumps, it is found to facilitate the work of the men shovelling, if the conveyer is advanced at the same rate as the material is removed and so reduce the distance the material has to be thrown by the men.

According to the present invention I provide an improved form of clamp for attaching the last trough, hereinafter called the loading trough, preferably fitted with wide end or shovel for easy loading, the arrangement being such that the desired adjustment in length is effected by the simple operation of a lever.

In one way of carrying out the present invention the rim of the telescopic trough is engaged between spring pressed and fixed jaws of a clamp, the pressure of the spring pressed jaws being capable of release by cam action actuated by a hand lever.

The invention will be illustrated by way of example with reference to the drawings left herewith:—

Figure 1:
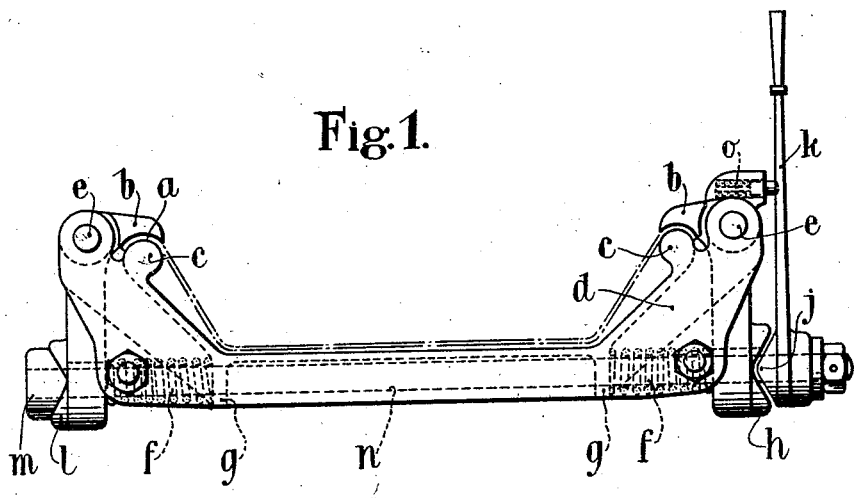
Figure 2:
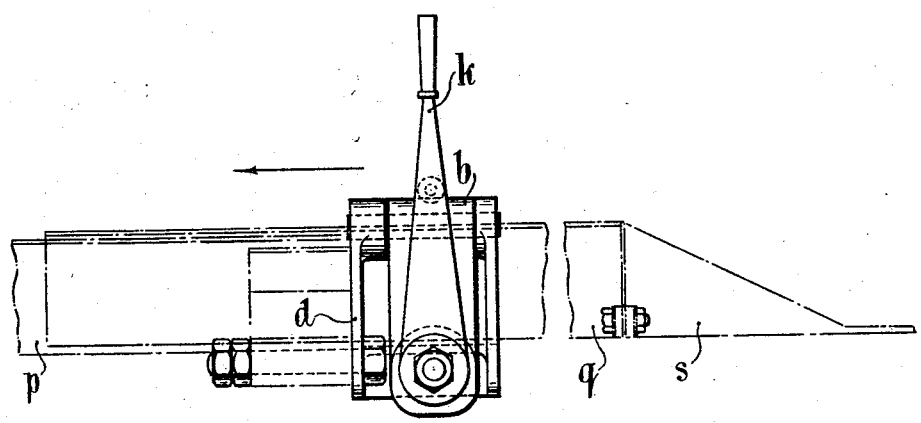

Figs. 1 and 2 are, respectively, end and side views.

Referring to the drawings,—

The rim $a$ of the trough $q$, which is the end trough of the conveyer and carries the shovel, is adapted to be held between the spring-pressed jaws $b$ and the fixed jaws $c$ formed on the casting $d$. The jaws $b$ are pivoted at $e$ to the casting $d$, the end of the jaw members remote from the jaws proper abutting against springs $f$ which abut at the other end against stops $g$ formed on the casting. The jaw $b$ adjacent the operating handle $k$ carries at one extremity a female cam $h$ adapted to coact with a male cam $j$ carried on the handle $k$. The other jaw $b$ also carries a female cam $l$ adapted to coact with a male cam $m$ fixed to the shaft $n$. The handle $k$ is also fixed to the shaft $n$, so that the latter can be operated by the said handle. A spring $o$ connected to the casting and to the handle maintains the latter in a substantially vertical position. The arrangement is such that by moving the handle in a plane at right angles to the plane of the drawings, the cams are actuated to lift the jaws $b$, and on releasing the handle the jaws are returned to their gripping position under the action of the springs $f$.

The operation of the device can be better understood with reference to Fig. 2. The device is bolted to the trough $p$, which is the last trough but one in the conveyer, the last trough $q$ overlapping the trough $p$ at one end, and having a shovel $s$ fixed to the other end. If now the handle $k$ is moved to actuate the jaws $b$ as the troughing moves in the direction indicated by the arrow in Fig. 2, the trough $q$ will not share the movement of the conveyer until the handle $k$ is released, whereupon the springs $f$ cause the jaws $b$ again to grip the rim of the trough $q$. It will of course be necessary from time to time to insert another trough section in the conveyer.

By the use of the present invention it is possible to make accurate and quick adjustment for length at the shovel end of the trough.

What I claim and desire to secure by Letters Patent is:—

1. A clamp for use at the shovel end of a shaker conveyer comprising a pivoted spring-pressed jaw, a fixed jaw adapted to coact with the pivoted spring-pressed jaw to grip the rim of a trough, and a lever for rotating the spring-pressed jaw on its pivot against its spring to release the trough.

2. A clamp for use at the shovel end of a shaker conveyer comprising a shaft, a pivoted spring-pressed jaw mounted at or near each end of the shaft, a fixed jaw adapted to co-operate with each spring-pressed jaw to grip the rim of a trough, and a lever for rotating both spring-pressed jaws on their pivots against spring action to release the trough.

3. A clamp according to claim 1 further comprising a cam device operatively disposed between the lever and the pivoted spring-pressed jaw.

4. In a shaker conveyer, a casting having cast thereon fixed jaws, a pivoted jaw for each fixed jaw, a spring for holding each pivoted jaw in operative relation with its fixed jaw, and means for moving as a unit all of said pivoted jaws around their pivots against the action of the spring.

5. In a shaker conveyer, a pair of spaced fixed jaws, a pivoted jaw for each fixed jaw, each pivoted jaw having an arm thereon extending beyond the pivot, a spring acting on each arm to press its jaw against a fixed jaw, and means engaging both arms and operable to release the pivoted jaws.

6. In a shaker conveyer, a pair of spaced fixed jaws, a movable jaw for each fixed jaw, each movable jaw having a cam arm, means engaging each arm to press the movable jaw against its fixed jaw, and a shaft having a pair of cams thereon, one for each cam arm, and engaging the cam thereon so that when the shaft is moved the arms are operated to release the movable jaws from the fixed jaws.

7. In a shaker conveyer, a casting having a pair of fixed jaws and a pair of stops, one adjacent each fixed jaw, a movable jaw for each fixed jaw, a spring between each stop, to press the movable jaw against its fixed jaw, and means for moving by one operation the movable jaws from the fixed jaws.

8. In a shaker conveyer, a casting having fixed jaws and a stop adjacent each jaw, a movable jaw for each fixed jaw, a spring between each stop to press the movable jaw in engagement with its fixed jaw, a shaft on the casting, and means on the shaft operable to move the movable jaws against the spring action away from the fixed jaws.

9. In a shaker conveyer, a casting removably mounted on the troughing having cast thereon fixed jaws, a pivoted jaw for each fixed jaw, a spring for holding each pivoted jaw in operative relation with its fixed jaw, and means for moving as a unit all of said pivoted jaws around their pivots against the action of the spring.

10. In a shaker conveyer, a casting removably mounted on the troughing having a pair of fixed jaws and a pair of stops, one adjacent each fixed jaw, a movable jaw for each fixed jaw, a spring between each stop to press the movable jaw against its fixed jaw, and means for moving by one operation the movable jaws from the fixed jaws.

11. In a shaker conveyer, a casting removably mounted on the troughing having fixed jaws and a stop adjacent each jaw, a movable jaw for each fixed jaw, a spring between each stop to press the movable jaw in engagement with its fixed jaw, a shaft on the casting, and means on the shaft operable to move the movable jaws against the spring action away from the fixed jaws.

In testimony whereof, I affix my signature.

TAGE GEORG NYBORG.